United States Patent [19]
Leonelli, Jr.

[11] Patent Number: 5,426,831
[45] Date of Patent: Jun. 27, 1995

[54] PUSH-ON WIRE RETAINER TAB
[75] Inventor: Frank P. Leonelli, Jr., Ogden, Utah
[73] Assignee: Morton International, Inc., Chicago, Ill.
[21] Appl. No.: 191,307
[22] Filed: Feb. 3, 1994
[51] Int. Cl.6 .................. A44B 21/00; F16B 21/00
[52] U.S. Cl. .................... 24/459; 24/530; 411/527; 439/595
[58] Field of Search ............... 24/459, 530; 411/525, 411/526, 527; 248/74.4, 74.5; 439/595, 801

[56] References Cited
U.S. PATENT DOCUMENTS

| 1,307,240 | 6/1919 | Christopher . | |
| 2,141,222 | 12/1938 | Pioch | 248/74.4 |
| 2,367,039 | 1/1945 | Martine-Lally et al. | 248/74 |
| 2,886,270 | 5/1959 | Wendela | 248/74 |
| 3,257,695 | 6/1966 | Frame | 24/459 |
| 3,326,509 | 6/1967 | Kuttler | 411/527 |
| 4,588,152 | 5/1986 | Ruehl et al. | 248/71 |
| 5,142,744 | 9/1992 | Bruning | 24/16 R |

FOREIGN PATENT DOCUMENTS

| 0082492 | 1/1964 | France | 248/74.5 |
| 2257036 | 8/1975 | France | 411/527 |
| 2306847 | 12/1990 | Japan . | |
| 0189038 | 4/1964 | Sweden | 24/459 |
| 1069893 | 5/1967 | United Kingdom | 411/527 |

OTHER PUBLICATIONS

Detail Drawing, View G (Scale: 4/1).

Primary Examiner—Victor N. Sakran
Attorney, Agent, or Firm—Mark F. LaMarre; Henry W. Tarring, II; Gerald K. White

[57] ABSTRACT

A retention device for securing electrical wires in an air bag module adjacent to an inflator. The push-on fastener tab of this invention quickly secures electrical wires while providing for easy removal. Further, the push-on fastener tabs occupy a minimum of space in the air bag module.

7 Claims, 2 Drawing Sheets

PUSH-ON WIRE RETAINER TAB

BACKGROUND OF THE INVENTION

1. Field of the Invention

This invention relates generally to inflatable type modular occupant restraint systems for passenger vehicles or, as they are more commonly known, air bag restraint systems. More particularly, this invention relates to an improved means for quickly securing electrical wires adjacent to the air bag inflator.

2. Description of Related Art

An air bag restraint system typically includes a canister, which has an open side and encloses an inflator and at least part of an air bag, and a cover which conceals the module from view. When the air bag module is designed for the passenger side of a vehicle, the container may be located just behind the vehicle dashboard, cosmetic cover, or passenger side instrument panel (hereinafter referred to as "dashboard") and the cover may form an integral part of the vehicle dashboard.

When the vehicle is involved in a collision, a crash signal initiates operation of the inflator to cause the air bag to deploy. The inflator produces an inert gas (e.g., nitrogen) which is directed under pressure into the air bag to force the air bag out of the canister incorporated in the module and into the passenger compartment of the vehicle. As the air bag is forced out of the module the pressure exerted on the driver side cover or dashboard causes selected portions of the cover or dashboard to separate, in a predetermined manner along tear seams or breakaway seams (hereinafter referred to as "tear seams") to enable the air bag to be directed into the passenger compartment.

A number of electrical wires associated with the operation of the air bag module are routed in close proximity to the inflator. Further, in the case of a driver side module, electrical wires associated with the operation of the horn or other electrical devices may be routed near the inflator. To provide for efficient assembly and to ensure that electrical wires do not move out of position during the life of the air bag module, electrical wires are secured by a number of different methods.

One possible way to secure electrical wires is to use wire ties to bundle a number of electrical cords, thereby relying on the bundle to secure the position of the wires. The wire ties are then secured to a part of the module structure. However, due to the limited number of attachment points in a module, it may be difficult to attach the wire tie to the module structure. Further, due to space limitation within the module, any additional parts added to the air bag module must be sized within strict tolerances.

Alternatively, a plastic inflator cap that is inserted over the inflator and which is attached to fasteners which hold the inflator in place may be used to hold electrical wires in position. This inflator cap operates to provide a mounting base for wires, or wires can be inserted beneath the inflator cap. However, as inflator designs change, the inflator cap must be modified to fit securely on each different inflator design. Further, changes in other components within the module may make the inflator cap obsolete. Also, the inflator cap is not compatible with passenger side modules or other modular occupant restraint devices for use in a passenger vehicle. A wire retention device which provides flexibility under different attachment situations and which provides for easy installation and removal is preferred.

SUMMARY OF THE INVENTION

An object of this invention is to provide a device for securing electrical wires and cables in close proximity to an automotive air bag inflator.

Another object of this invention is to provide a quick reliable means for securing electrical wires and cables associated with an automotive air bag inflator, which securing means can be removed without special tools.

Another object of this invention is to provide a device for securing electrical wires which device does not occupy a significant amount of the limited space available within the air bag module.

These and other objectives of the invention, which will become apparent from the following description, have been achieved by a novel fastening device for securing electrical wires. The fastener device of this invention is a thin, flat push-on fastener having an aperture located near one edge. The push-on fastener is inserted onto one or more of the studs which are used to hold an air bag inflator in place. The inner wall of the push-on fastener aperture engages with the outer surface of the stud thereby securing the electrical wires in the space defined by the stud, the base for the post, the wall of the inflator and the push-on fastener. The push-on fastener may be made from any semi-rigid polymer or the like. Also, a number of cuts radially outward from the aperture may be made to form tabs of material which allow the material around the aperture to more readily deform. The tabs allow the fastener adjacent to the aperture to deform, thereby permitting the aperture wall to better engage with the walls of the stud.

BRIEF DESCRIPTION OF THE DRAWINGS

With this description of the invention, a detailed description follows with reference being made to the accompanying figures of drawings which form part of the specification related thereto, in which like parts are designated by the same reference numbers, and of which.

DETAILED DESCRIPTION OF THE INVENTION

Description of the Preferred Embodiment

Figure 1:
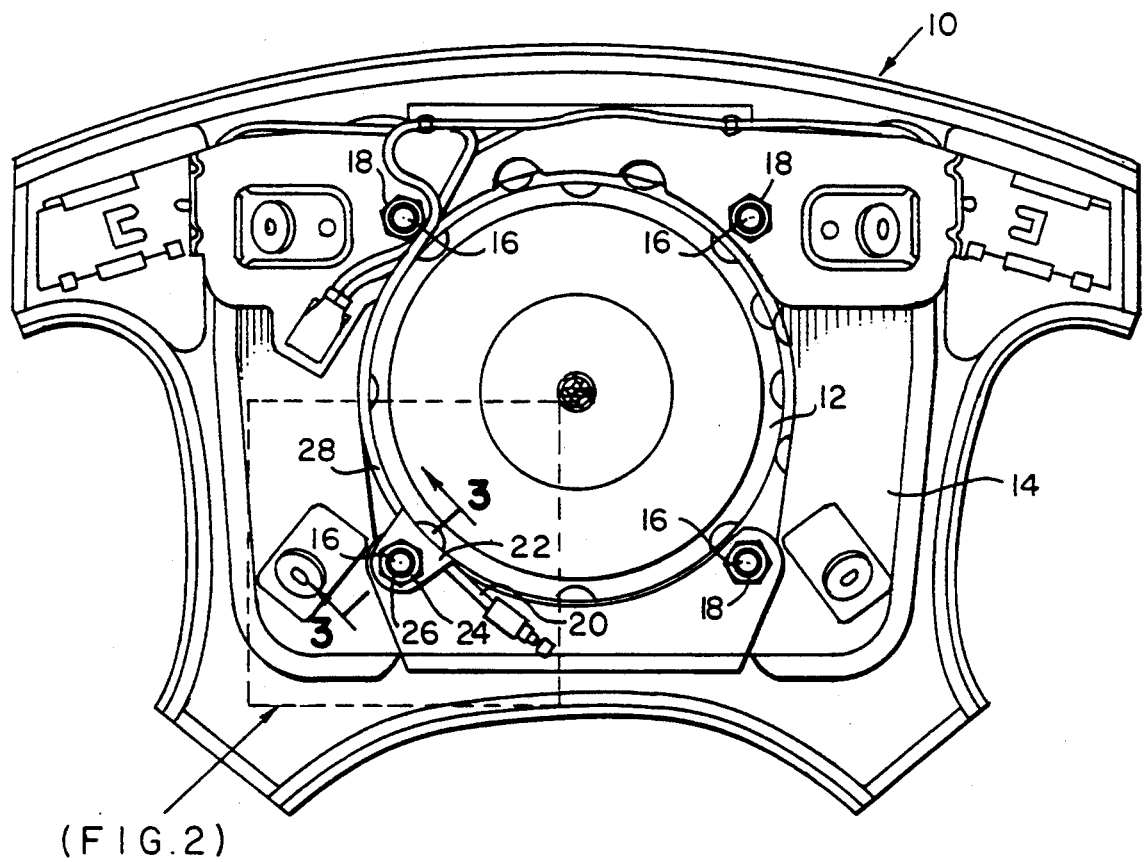
FIG. 1 is a top plan view illustrating the installation of the push-on fastener of this invention as installed in a driver side module.
Figure 2:
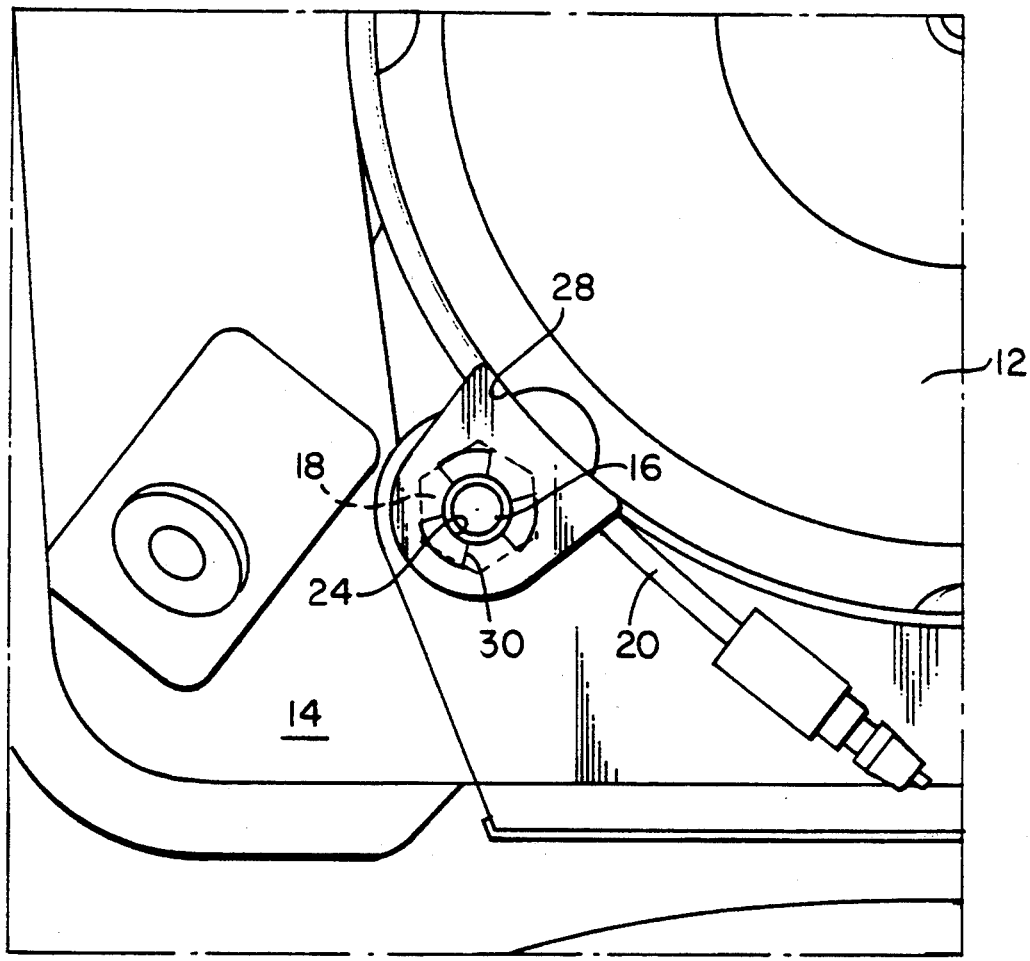
FIG. 2 is a detailed view of section 2 of FIG. 1.
Figure 3:
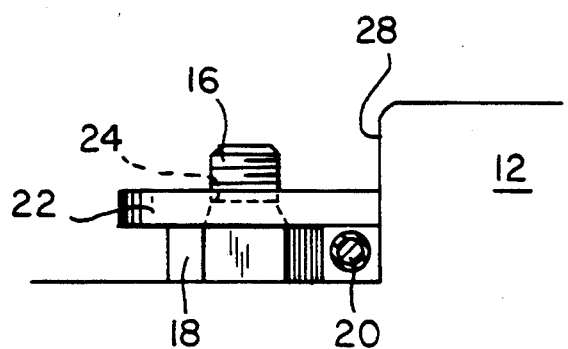
FIG. 3 is a cross-sectional view taken along line 3—3 of FIG. 1 illustrating the push-on fastener as used to retain an electrical wire adjacent to a driver side inflator.

Referring to FIG. 1, a driver side inflator module (with air bag and cover removed) as shown generally at 10 is provided for producing a gas to inflate an air bag cushion (not shown). The driver side module 10 comprises a driver side inflator 12 attached to module housing 14 with studs 16 and nuts 18. A horn switch wire 20 is routed around inflator 12. Push-on fastener 22 is inserted over studs 16 and is pressed into place to secure horn switch wire 20 in position. Studs 16 passage through aperature 24 in push-on fastener 22. As shown in FIGS. 2 and 3 push-on fastener 22 is placed over studs 16, thereby spanning the space between outer surface 26 of studs 16 to the outer surface 28 of inflator 12. Horn switch wire 20 or the like is contained with the space by nut 18, module housing 14, the outer surface 28 of inflator 12, and push-on fastener 22.

Figure 4:
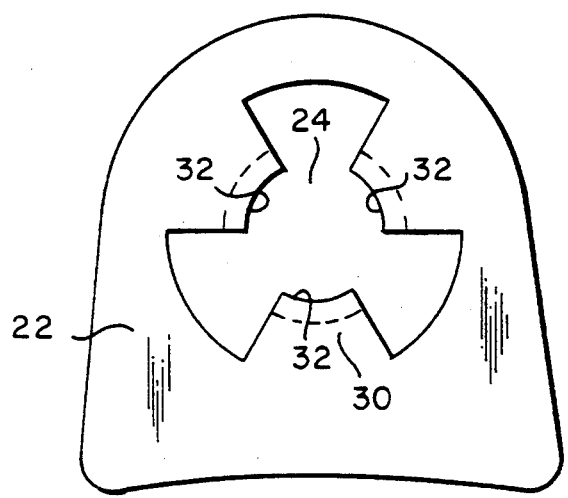
FIG. 4 is a top plan view illustrating the push-on fastener of this invention.
Figure 5:
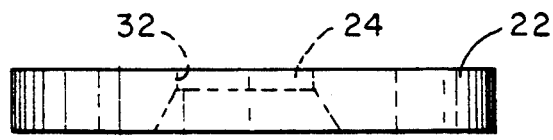
FIG. 5 is a side-plan view illustrating the push-on fastener.

As shown in FIGS. 4 and 5, the push-on fastener 22 comprises a thin planer section with an aperture 24. In order to simplify installation of the push-on fastener 22, tabs 30 may be provide in the push-on fastener 22 radially outward from aperture 24. Further, one side of the aperture 24 may be beveled to provide an improved gripping edge 32 that engages more effectively with studs 16. The inner edge of push-on fastener 22 may be curved to correspond to the curvature of the outer surface 28 of inflator 12. The push-on fastener 22 can be formed from any semi-rigid plastic such as, but not limited to, polyethylene, polypropylene, or nylon. The push-on fastener 22 can be formed using standard plastic fabrication methods.

The push-on tab 22 of this invention can be used with any driver side inflator 22. Further, although illustrated with a driver side inflator 22 the push-on tab 22 may be used with a passenger side inflator or any inflator device used in a passenger side vehicle.

Thus, in accordance with the invention, there has been provided a device for securing electrical wires and cables in close proximity to an automotive air bag inflator. There has also been provided a quick reliable means for securing electrical wires and cables associated with an automotive air bag inflator, which means can be removed without special tools. Additionally, there has been provided a device for securing electrical wires which device does not occupy a significant amount of the limited space available within the air bag module.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope to the invention be determined by the scope of the appended claims.

I claim:

1. A fastening device for securing electrical wire between a stud and the outer surface of an automotive inflator comprising:
    a fastener comprising a thin planer sheet of semi-rigid material and having an aperture passing through the fastener near one edge of said fastener, the aperture having inner wall surfaces;
    wherein an electrical wire is placed between said stud and said outer surface of the inflator, said fastener is inserted onto the stud such that said inner wall surface engage said stud and secures the electrical wire in place.

2. The fastener device of claim 1 further comprising a plurality of tabs spaced radially about the aperture of said fastener wherein said tabs deform and engage the outer surface of said stud.

3. The fastening device of claim 1 wherein said fastener spans the space between the stud and the first said outer surface of the inflator, engaging with said first surface to secure the electrical wire in position.

4. The fastener device of claim 1 wherein the fastener is made from a semi-rigid polymer.

5. A fastening device for securing electrical wire comprising: a base plate, a stud having an outer wall defining a stud of set diameter, said stud extending substantially perpendicular to the base plate, a first surface in spaced relationship to said stud; and
    a fastener comprising a thin planer sheet of semi-rigid material having an aperture passing through the fastener near one edge of the fastener the aperture having inner wall surfaces;
    wherein an electrical wire is placed between said stud and said first surface, said fastener is inserted onto the stud such that said inner wall surfaces of the aperture engage the outer wall of said stud and secure the electrical wire in place.

6. The fastening device of claim 5 wherein said fastener tab spans the space between the stud and the first surface, engaging with said first surface to secure the electrical wire in position.

7. A fastening device for securing electrical wire between a stud and the outer surface of an automotive air bag canister comprising:
    a fastener comprising a thin planer sheet of semi-rigid material and an aperture passing through the fastener near one edge of the fastener, the aperture having inner wall surfaces;
    wherein an electrical wire is placed between said stud and said outer surface of the canister, said fastener is inserted onto the stud such that said inner wall surface engages said stud and secures the electrical wire in position.

* * * * *

UNITED STATES PATENT AND TRADEMARK OFFICE
CERTIFICATE OF CORRECTION

PATENT NO. : 5,426,831
DATED : 27 June 1995
INVENTOR(S) : Frank P. Leonelli, Jr.

It is certified that error appears in the above-identified patent and that said Letters Patent is hereby corrected as shown below:

At column 2, lines 66 and 67, "studs 16" should be --stud 16--.

At column 2, line 67, "passage" should be --passes--.

At column 3, lines 2, 3 and 14, "studs 16" should be --stud 16--.

At column 3, lines 21 and 23, "tab 22" should be --fastener 22--.

At column 3, lines 22 and 23, "inflator 22" should be --inflator 12--.

Signed and Sealed this

Fourth Day of June, 1996

Attest:

BRUCE LEHMAN

Attesting Officer     Commissioner of Patents and Trademarks